United States Patent
Chu et al.

(10) Patent No.: US 11,492,435 B2
(45) Date of Patent: Nov. 8, 2022

(54) METHOD FOR PREPARING BIOMASS-BASED CONDUCTIVE HYDROGEL BY 3D PRINTING

(71) Applicant: INSTITUTE OF CHEMICAL INDUSTRY OF FOREST PRODUCTS CAF, Jiangsu (CN)

(72) Inventors: Fuxiang Chu, Jiangsu (CN); Jifu Wang, Jiangsu (CN); Chuanwei Lu, Jiangsu (CN); Chunpeng Wang, Jiangsu (CN)

(73) Assignee: INSTITUTE OF CHEMICAL INDUSTRY OF FOREST PRODUCTS CAF, Jiangsu (CN)

( * ) Notice: Subject to any disclaimer, the term of this patent is extended or adjusted under 35 U.S.C. 154(b) by 0 days.

(21) Appl. No.: 17/423,118

(22) PCT Filed: May 26, 2020

(86) PCT No.: PCT/CN2020/092244
§ 371 (c)(1),
(2) Date: Jul. 15, 2021

(87) PCT Pub. No.: WO2021/012776
PCT Pub. Date: Jan. 28, 2021

(65) Prior Publication Data
US 2022/0127402 A1  Apr. 28, 2022

(30) Foreign Application Priority Data

Jul. 25, 2019  (CN) .......................... 201910679806.0

(51) Int. Cl.
*C08F 251/02* (2006.01)
*B33Y 10/00* (2015.01)
(Continued)

(52) U.S. Cl.
CPC .......... *C08F 251/02* (2013.01); *B29C 64/129* (2017.08); *B29C 64/30* (2017.08);
(Continued)

(58) Field of Classification Search
None
See application file for complete search history.

(56) References Cited

U.S. PATENT DOCUMENTS

| | | | |
|---|---|---|---|
| 7,183,335 B2* | 2/2007 | Napadensky | .......... B41M 3/006 522/75 |
| 2015/0376466 A1* | 12/2015 | Mitamura | ............. G06F 3/0445 428/41.5 |
| 2020/0123425 A1* | 4/2020 | Chen | .................... B32B 15/095 |

FOREIGN PATENT DOCUMENTS

| | | |
|---|---|---|
| CN | 108948379 | 12/2018 |
| CN | 109503757 | 3/2019 |

(Continued)

OTHER PUBLICATIONS

Cheng, et al., Sustainable elastomers derived from cellulose, rosin and fatty acid by a combination of "graft from" RAFT and isocyanate chemistry, Mar. 14, 2019, Elsevier, International Journal of Biological Macromolecules, pp. 1-9 (Year: 2019).*
(Continued)

*Primary Examiner* — Monica A Huson
*Assistant Examiner* — Kelsey C Grace
(74) *Attorney, Agent, or Firm* — JCIP Global Inc.

(57) ABSTRACT

A method for preparing a biomass-based conductive hydrogel by 3D printing is provided. Firstly, a cellulose-based macromonomer, a rosin-based monomer, an acrylic acid monomer and an initiator are mixed in a certain proportion, stirred, and dissolved at 25-70° C. Then, diisocyanate in an amount of 5-10 wt % of a total mass of the monomers is added to the mixed solution and mixed uniformly to prepare a 3D printing photosensitive resin solution. An SLA light-
(Continued)

curing 3D printer is used to print a hydrogel precursor 1 with a complex shape. Next, the hydrogel precursor 1 is heated to obtain a hydrogel precursor 2 with a dual-curing network. Finally, the obtained hydrogel precursor 2 is swelled in a 1-15 wt % alkaline solution at 5-60° C. for 0.1-10 hours to obtain the biomass-based conductive hydrogel.

5 Claims, 1 Drawing Sheet

(51) Int. Cl.
    *B29C 64/129*     (2017.01)
    *B29C 64/30*     (2017.01)
    *B33Y 40/20*     (2020.01)
    *B33Y 70/10*     (2020.01)
    *C08G 18/63*     (2006.01)
    *C08J 3/075*     (2006.01)

(52) U.S. Cl.
    CPC ............... *B33Y 10/00* (2014.12); *B33Y 40/20* (2020.01); *B33Y 70/10* (2020.01); *C08G 18/63* (2013.01); *C08J 3/075* (2013.01); *C08J 2375/04* (2013.01); *C08J 2401/02* (2013.01)

(56) References Cited

FOREIGN PATENT DOCUMENTS

| CN | 109880024 | 6/2019 |
| --- | --- | --- |
| CN | 109942838 | 6/2019 |
| CN | 110358115 | 10/2019 |

OTHER PUBLICATIONS

"International Search Report (Form PCT/ISA/210) of PCT/CN2020/092244," dated Aug. 18, 2020, with English translation thereof, pp. 1-4.

"Written Opinion of the International Searching Authority (Form PCT/ISA/237) of PCT/CN2020/092244," dated Aug. 18, 2020, with English translation thereof, pp. 1-8.

\* cited by examiner

METHOD FOR PREPARING BIOMASS-BASED CONDUCTIVE HYDROGEL BY 3D PRINTING

CROSS-REFERENCE TO RELATED APPLICATION

This application is a 371 of international application of PCT application serial No. PCT/CN2020/092244, filed on May 26, 2020, which claims the priority benefit of China application no. 201910679806.0, filed on Jul. 25, 2019. The entirety of each of the above mentioned patent applications is hereby incorporated by reference herein and made a part of this specification.

BACKGROUND

Technical Field

The present invention relates to the technical field of polymer materials, and in particular to a method for preparing a biomass-based conductive hydrogel by 3D printing.

Description of Related Art

With the increasing consumption of petroleum and fossil resources and the growing concern about environmental pollution, the use of renewable resources to prepare polymeric functional materials has attracted more and more attention from scientific researchers. As a polymer material with a three-dimensional network structure that can absorb and retain water but is insoluble in water, hydrogels have been widely used in the fields of biomedicine, petrochemical industry, food, cosmetics, and electronics & electrical appliances. As the most abundant renewable resource in the world, cellulose has been widely used in the preparation of hydrogels because of its wide source, low price, good biocompatibility, and excellent mechanical properties. As another renewable natural resource, rosin has an excellent hydrophobic property due to its unique ternary phenanthrene skeleton, which greatly limits the application of rosin in the field of hydrogels. Although water-soluble polymerizable rosin monomers have been prepared by modifying the rosin, there are problems of a complicated preparation process and high cost. There are few research reports on the preparation of hydrogels using common oil-soluble acrylic-based rosin monomers.

Moreover, according to the response to external stimuli, the hydrogels can be classified into conventional hydrogels and intelligent response hydrogels. Conductive hydrogels have attracted great interest as the intelligent response hydrogels and have been used in sensor, capacitor, and tissue materials, and other fields. However, such hydrogels reported so far have an obvious problem of low mechanical strength, which is far from meeting the needs of practical applications. Moreover, the prepared hydrogel has a relatively single shape, and thus cannot be constructed into complex shapes, which greatly limits the application of conductive hydrogels. 3D printing, as an advanced preparation technology, realizes the construction of complex shapes through layer-by-layer accumulation using 3D models or CAD files. Therefore, there is an urgent need and great research significance to prepare cellulose- and rosin-derived biomass-based conductive hydrogels by means of 3D printing technology and the strategy of swelling after molding.

SUMMARY

The technical problem to be solved is as follows: The present invention provides a method for preparing a biomass-based conductive hydrogel by 3D printing, where the prepared biomass-based conductive hydrogel has a customizable complex shape and excellent electrical conductivity, and can be used as a novel sensor, capacitor, and tissue material, thus broadening the application fields of biomass resources such as cellulose and rosin.

A method for preparing a biomass-based conductive hydrogel by 3D printing includes the following steps:

step 1: mixing an ethyl cellulose-based macromonomer, a rosin-based monomer, an acrylic acid monomer, and an initiator in a certain proportion, stirring, and dissolving at 25-70° C.; and then, adding diisocyanate in an amount of 5-10 wt % of a total mass of the monomers to the mixed solution and mixing uniformly to prepare a 3D printing photosensitive resin solution;

step 2: using an SLA light-curing 3D printer to print a hydrogel precursor 1 with a complex shape, and then heating the hydrogel precursor 1 to obtain a hydrogel precursor 2 with a dual-curing network; and step 3: finally, swelling the obtained hydrogel precursor 2 in a 1-15 wt % alkaline solution at 5-60° C. for 0.1-10 hours to obtain the biomass-based conductive hydrogel.

Preferably, the ethyl cellulose-based macromonomer described in step 1 has the following structure:

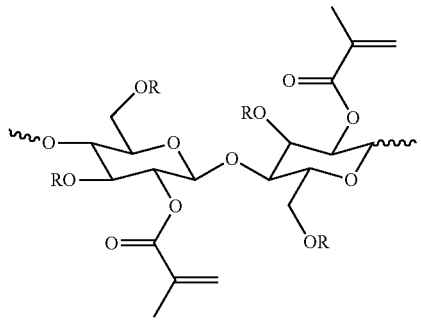

where the ethyl cellulose used therein has a viscosity of any one of 3-7 mPa·s, 9-11 mPa·s, 18-22 mPa·s, 45-55 mPa·s, 90-110 mPa·s, 180-220 mPa·s, and 270-330 mPa·s.

Preferably, the rosin-based monomer described in step 1 has the following structure:

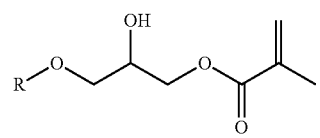

where R denotes a rosin structure, and the used rosin is any one of L-pimaric acid, abietic acid, dehydroabietic acid, pimaric acid, and disproportionated rosin.

Preferably, the acrylic acid monomer described in step 1 is one of hydroxyethyl acrylate, hydroxyethyl methacrylate, and hydroxypropyl acrylate.

Preferably, the initiator described in step 1 is one of (2,4,6-trimethylbenzoyl)diphenylphosphine oxide, benzil dimethyl ketal, and 2-hydroxy-4'-(2-hydroxyethoxy)-2-methylpropiophenone.

Preferably, the diisocyanate described in step 1 is one of toluene diisocyanate (TDI), isophorone diisocyanate (IPDI), methylenediphenyl diisocyanate (MDI), dicyclohexylmethane diisocyanate (HMDI), hexamethylene diisocyanate (HDI), and lysine diisocyanate (LDI).

Preferably, the certain proportion described in step 1 is a mass ratio of [the ethyl cellulose-based macromonomer]: [the rosin-based monomer]: [the acrylic acid monomer]: [the initiator]=0.3:2:8:0.2.

Preferably, the heat treatment described in step 2 is performed at 110° C. for 8 hours.

Preferably, the alkaline solution described in step 3 is one of a sodium hydroxide solution and a potassium hydroxide solution.

The present invention has the following advantageous effects: 1. The present invention relates to a method for preparing a biomass-based conductive hydrogel by 3D printing, which can prepare a biomass-based hydrogel with a customizable shape. The present invention has such advantages as a wide source of raw materials, easy operation, and a green and harmless preparation process, thus facilitating broadening of the application fields of biomass resources. 2. The biomass-based conductive hydrogel prepared by the present invention has excellent electrical conductivity and mechanical properties, and can be used as a novel sensor, capacitor, and tissue material, thus realizing high-value utilization of the biomass resources.

DESCRIPTION OF THE EMBODIMENTS

Figure 1:
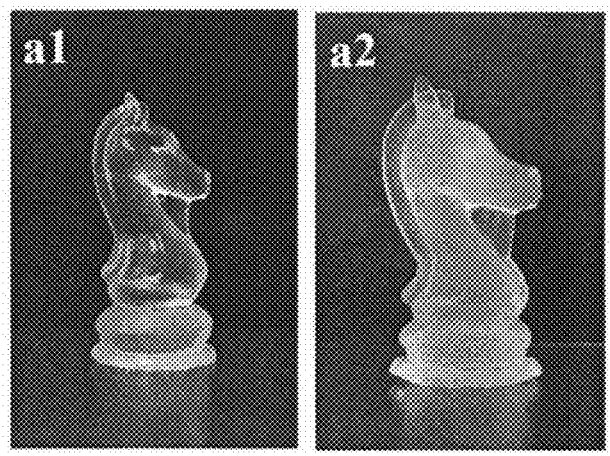
FIG. 1 shows pictures of a hydrogel precursor 2 before and after swelling in Example 1.

Because a method for preparing a biomass-based conductive hydrogel by 3D printing has a great impact, the content of the present invention is further described below with reference to specific examples. However, these examples are not intended to limit the protection scope of the present invention.

Example 1: preparation of a biomass-based conductive hydrogel in a ratio of [an ethyl cellulose-based macromonomer]: [a rosin-based monomer]: [an acrylic acid monomer]: [an initiator]=0.3:2:8:0.2.

Step 1: First, 0.9 g of ethyl cellulose-based macromonomer with a viscosity of 3-7 mPa·s, 6 g of disproportionated rosin-based monomer, 24 g of hydroxyethyl acrylate, and 0.6 g of (2,4,6-trimethylbenzoyl)diphenylphosphine oxide were mixed, and stirred and sufficiently dissolved at 70° C.; and then 1.5 g of hexamethylene diisocyanate was added to the mixed solution and mixed uniformly to prepare a 3D printing photosensitive resin solution.

Step 2: An SLA light-curing 3D printer was used to print a hydrogel precursor 1 with a complex shape, and then the hydrogel precursor 1 was heated at 110° C. for 8 hours to obtain a hydrogel precursor 2 with a dual-curing network.

Step 3: Finally, the obtained hydrogel precursor 2 was swelled in a 10 wt % sodium hydroxide solution at 40° C. for 5 hours to obtain the biomass-based conductive hydrogel.

Example 2: preparation of a biomass-based conductive hydrogel in a ratio of [an ethyl cellulose-based macromonomer]: [a rosin-based monomer]: [an acrylic acid monomer]: [an initiator]=0.3:2:8:0.2.

Step 1 was identical to that in Example 1.

Step 2: An SLA light-curing 3D printer was used to print a hydrogel precursor 1 with a complex shape, and then the hydrogel precursor 1 was heated at 80° C. for 5 hours to obtain a hydrogel precursor 2 with a dual-curing network.

Step 3: Finally, the obtained hydrogel precursor 2 was swelled in a 5 wt % potassium hydroxide solution at 20° C. for 4 hours to obtain the biomass-based conductive hydrogel.

Example 3: preparation of a biomass-based conductive hydrogel in a ratio of [an ethyl cellulose-based macromonomer]: [a rosin-based monomer]: [an acrylic acid monomer]: [an initiator]=0.5:4:6:0.3.

Step 1: First, 1 g of ethyl cellulose-based macromonomer with a viscosity of 90-110 mPa·s, 8 g of dehydroabietic acid monomer, 12 g of hydroxyethyl acrylate, and 0.6 g of benzil dimethyl ketal were mixed, and stirred and sufficiently dissolved at 60° C.; and then 1.6 g of toluene diisocyanate was added to the mixed solution and mixed uniformly to prepare a 3D printing photosensitive resin solution.

Step 2 was identical to that in Example 1.

Step 3 was identical to that in Example 1.

Example 4: preparation of a biomass-based conductive hydrogel in a ratio of [an ethyl cellulose-based macromonomer]: [a rosin-based monomer]: [an acrylic acid monomer]: [an initiator]=0.5:4:6:0.3.

Step 1 was identical to that in Example 3.

Step 2: An SLA light-curing 3D printer was used to print a hydrogel precursor 1 with a complex shape, and then the hydrogel precursor 1 was heated at 80° C. for 5 hours to obtain a hydrogel precursor 2 with a dual-curing network.

Step 3: Finally, the obtained hydrogel precursor 2 was swelled in a 5 wt % potassium hydroxide solution at 20° C. for 4 hours to obtain the biomass-based conductive hydrogel.

Example 5: preparation of a biomass-based conductive hydrogel in a ratio of [an ethyl cellulose-based macromonomer]: [a rosin-based monomer]: [an acrylic acid monomer]: [an initiator]=0.5:4:6:0.3.

Step 1: First, 1 g of ethyl cellulose-based macromonomer with a viscosity of 270-330 mPa·s, 8 g of dehydroabietic acid monomer, 12 g of hydroxyethyl acrylate, and 0.6 g of (2,4,6-trimethylbenzoyl)diphenylphosphine oxide were mixed, and stirred and sufficiently dissolved at 60° C.; and then 2 g of toluene diisocyanate was added to the mixed solution and mixed uniformly to prepare a 3D printing photosensitive resin solution.

Step 2: An SLA light-curing 3D printer was used to print a hydrogel precursor 1 with a complex shape, and then the hydrogel precursor 1 was heated at 100° C. for 8 hours to obtain a hydrogel precursor 2 with a dual-curing network.

Step 3: Finally, the obtained hydrogel precursor 2 was swelled in a 10 wt % sodium hydroxide solution at 50° C. for 5 hours to obtain the biomass-based conductive hydrogel.

Example 6: preparation of a biomass-based conductive hydrogel in a ratio of [an ethyl cellulose-based macromonomer]: [a rosin-based monomer]: [an acrylic acid monomer]: [an initiator]=0.3:2:8:0.2.

Step 1: First, 0.9 g of ethyl cellulose-based macromonomer with a viscosity of 3-7 mPa·s, 6 g of disproportionated rosin-based monomer, 24 g of hydroxyethyl methacrylate, and 0.6 g of 2-hydroxy-4'-(2-hydroxyethoxy)-2-methylpropiophenone were mixed, and stirred and sufficiently dissolved at 70° C.; and then 1.5 g of hexamethylene diisocyanate was added to the mixed solution and mixed uniformly to prepare a 3D printing photosensitive resin solution.

Step 2: An SLA light-curing 3D printer was used to print a hydrogel precursor 1 with a complex shape, and then the hydrogel precursor 1 was heated at 110° C. for 5 hours to obtain a hydrogel precursor 2 with a dual-curing network.

Step 3: Finally, the obtained hydrogel precursor 2 was swelled in a 5 wt % sodium hydroxide solution at 40° C. for 8 hours to obtain the biomass-based conductive hydrogel.

Analysis of Spectra

FIG. 1 shows pictures of the hydrogel precursor 2 before and after swelling in Example 1. It can be found from the figure that the hydrogel obtained after swelling significantly increases in volume, but still maintains a 3D shape. It is shown that the hydrogel obtained after swelling has excellent shape fidelity, which further indicates that the preparation method of the present invention can prepare a hydrogel with a complex shape.

Figure 2:
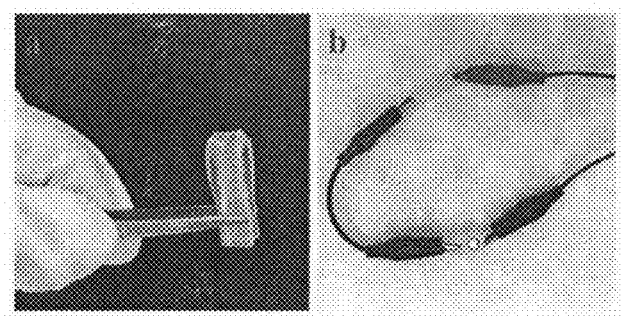
FIG. 2 shows pictures of bending and conductivity tests on the hydrogel precursor 2 after swelling in Example 1.

FIG. 2 shows pictures of bending and conductivity tests on the hydrogel precursor 2 after swelling in Example 1. It can be found from the figure that the hydrogel obtained after swelling has excellent flexibility and can be bent in any way; and exhibits excellent conductivity and can light up the bulb when being connected to a circuit.

Figure 3:
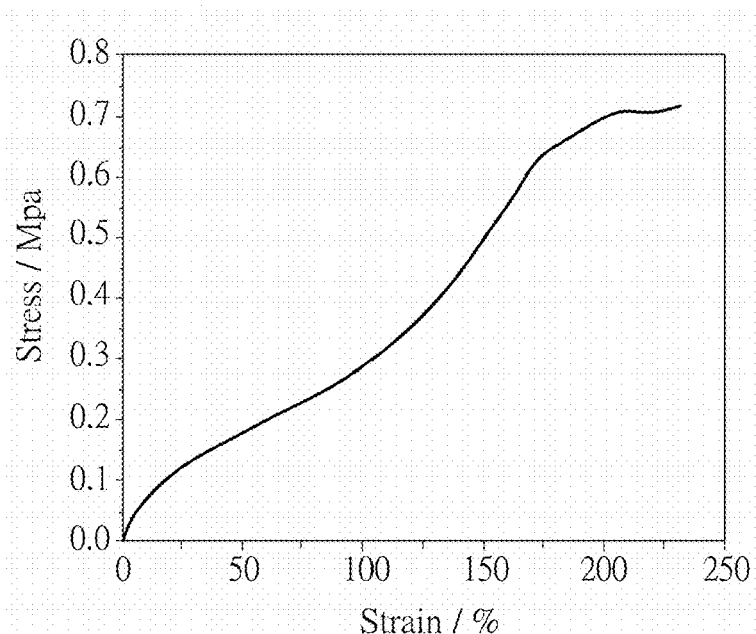
FIG. 3 shows a stress-strain curve of the hydrogel precursor 2 after swelling in Example 1.

FIG. 3 shows a stress-strain curve of the hydrogel precursor 2 after swelling in Example 1. It can be found from the figure that the hydrogel obtained after swelling exhibits excellent mechanical properties.

The foregoing examples describe the technical solution of the present invention in detail. It should be understood that, the foregoing description merely describes preferred examples of the present invention, and is not intended to limit the present invention. Any person skilled in the art can, without departing from the scope of the technical solution of the present invention, use the technical content disclosed above to make some changes or modifications into equivalent examples with equivalent changes. However, any modifications or improvements made within the principle scope of the present invention all shall fall within the scope of the present invention.

What is claimed is:

1. A method for preparing a biomass-based conductive hydrogel by 3D printing, comprising the following steps:
   step 1: mixing an ethyl cellulose-based macromonomer, a rosin-based monomer, an acrylic acid monomer and an initiator in a certain proportion, stirring and dissolving at 25-70° C.; and then, adding diisocyanate in an amount of 5-10 wt % of a total mass of the monomers to the mixed solution and mixing uniformly to prepare a 3D printing photosensitive resin solution,
   wherein the ethyl cellulose-based macromonomer described in step 1 has the following structure:

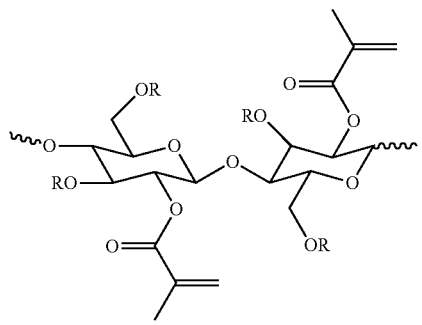

wherein the ethyl cellulose used therein has a viscosity of any one of 3-7 mPa·s, 9-11 mPa·s, 18-22 mPa·s, 45-55 mPa·s, 90-110 mPa·s, 180-220 mPa·s and 270-330 mPa·s, and R is hydrogen or ethyl group,
   wherein the rosin-based monomer described in step 1 has the following structure:

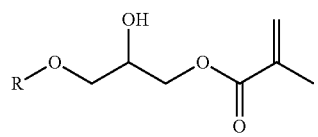

wherein R denotes a rosin structure, and the used rosin is any one of L-pimaric acid, abietic acid, dehydroabietic acid, pimaric acid and disproportionated rosin,
   wherein the acrylic acid monomer described in step 1 is one of hydroxyethyl acrylate, hydroxyethyl methacrylate and hydroxypropyl acrylate;
   step 2: using an SLA light-curing 3D printer to print a hydrogel precursor 1 with a complex shape, and then heating the hydrogel precursor 1 to obtain a hydrogel precursor 2 with a dual-curing network, wherein the heat treatment described in step 2 is performed at 70-150° C. for 4-10 hours; and
   step 3: finally, swelling the obtained hydrogel precursor 2 in a 1-15 wt % alkaline solution at 5-60° C. for 0.1-10 hours to obtain the biomass-based conductive hydrogel.

2. The method for preparing the biomass-based conductive hydrogel by 3D printing according to claim 1, wherein the initiator described in step 1 is one of (2,4,6-trimethylbenzoyl)diphenylphosphine oxide, benzil dimethyl ketal and 2-hydroxy-4'-(2-hydroxyethoxy)-2-methylpropiophenone.

3. The method for preparing the biomass-based conductive hydrogel by 3D printing according to claim 1, wherein the diisocyanate described in step 1 is one of toluene diisocyanate (TDI), isophorone diisocyanate (IPDI), methylenediphenyl diisocyanate (MDI), dicyclohexylmethane diisocyanate (HMDI), hexamethylene diisocyanate (HDI) and lysine diisocyanate (LDI).

4. The method for preparing the biomass-based conductive hydrogel by 3D printing according to claim 1, wherein the certain proportion described in step 1 is a mass ratio of [the ethyl cellulose-based macromonomer]: [the rosin-based monomer]: [the acrylic acid monomer]: [the initiator]=[0.2-1]: [1-5]: [5-9]: [0.1-0.5].

5. The method for preparing the biomass-based conductive hydrogel by 3D printing according to claim 1, wherein the alkaline solution described in step 3 is one of a sodium hydroxide solution and a potassium hydroxide solution.

* * * * *